(12) United States Patent
Amanullah

(10) Patent No.: US 10,619,433 B2  
(45) Date of Patent: *Apr. 14, 2020

(54) ARC PERM-SQUEEZE RDF—A PERMEABLE PLUG FORMING RAPIDLY DEHYDRATING FLUID

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,141

(22) Filed: Mar. 26, 2019

(65) Prior Publication Data

US 2019/0218871 A1 Jul. 18, 2019

Related U.S. Application Data

(62) Division of application No. 15/815,159, filed on Nov. 16, 2017, now Pat. No. 10,352,116.

(51) Int. Cl.
*E21B 21/00* (2006.01)
*C09K 8/487* (2006.01)
(Continued)

(52) U.S. Cl.
CPC .............. *E21B 21/003* (2013.01); *C09K 8/03* (2013.01); *C09K 8/145* (2013.01); *C09K 8/487* (2013.01); *C09K 8/514* (2013.01); *C09K 8/516* (2013.01); *E21B 33/138* (2013.01); *C09K 8/20* (2013.01); *C09K 2208/08* (2013.01)

(58) Field of Classification Search
None
See application file for complete search history.

(56) References Cited

U.S. PATENT DOCUMENTS 3,082,823 A  3/1963 Hower  
3,208,523 A  9/1965 Coyle et al.  
(Continued)

FOREIGN PATENT DOCUMENTS

WO  2010088484 A2  8/2010

OTHER PUBLICATIONS

International Search Report and Written Opinion for related PCT application PCT/US2018/061006 (SA5818) dated Jan. 18, 2019; pp. 1-17.

(Continued)

*Primary Examiner* — Andrew Sue-Ako
(74) *Attorney, Agent, or Firm* — Bracewell LLP; Constance G. Rhebergen; Brian H. Tompkins

(57) ABSTRACT

A rapidly dehydrating lost circulation material (LCM) composition that forms a permeable plug is provided. The LCM composition may include a carrier fluid, a clay particulate material, a viscosifier, and date tree waste fibers. The carrier fluid may be water and the viscosifier may be a cellulosic microfiber. The LCM composition may mitigate or prevent lost circulation by forming a plug in a fracture of the lost circulation zone and may also enable the production of hydrocarbons from the zone without removal of the plug via an acid treatment. Methods of lost circulation control and manufacture of the rapidly dehydrating LCM are also provided.

5 Claims, 2 Drawing Sheets

(51) Int. Cl.
*C09K 8/14* (2006.01)
*C09K 8/514* (2006.01)
*E21B 33/138* (2006.01)
*C09K 8/516* (2006.01)
*C09K 8/03* (2006.01)
*C09K 8/20* (2006.01)

(56) References Cited

U.S. PATENT DOCUMENTS

| | | | |
|---|---|---|---|
| 3,253,664 | A | 5/1966 | Sauber et al. |
| 3,380,542 | A | 4/1968 | Clear |
| 3,788,405 | A | 1/1974 | Taylor |
| 4,369,844 | A | 1/1983 | Clear |
| 4,503,170 | A | 3/1985 | Drake et al. |
| 4,964,465 | A | 10/1990 | Surles |
| 6,790,812 | B2 | 9/2004 | Halliday et al. |
| 7,544,642 | B2 | 6/2009 | Luke et al. |
| 8,739,872 | B1 | 6/2014 | Miller |
| 9,701,881 | B2 | 7/2017 | Morris |
| 10,023,781 | B2 * | 7/2018 | Amanullah ............... C09K 8/03 |
| 10,087,353 | B2 | 10/2018 | Amanullah |
| 2009/0054269 | A1 | 2/2009 | Chatterji et al. |
| 2011/0214870 | A1 | 9/2011 | Shaarpour |
| 2012/0108472 | A1 | 5/2012 | Wu |
| 2014/0262283 | A1 | 9/2014 | Savari et al. |
| 2014/0374110 | A1 | 12/2014 | Wu |
| 2015/0292279 | A1 | 10/2015 | Wang |
| 2016/0068733 | A1 | 3/2016 | Jamison et al. |
| 2017/0058180 | A1 | 3/2017 | Hossain et al. |
| 2017/0137688 | A1 | 5/2017 | Amanullah |
| 2017/0298263 | A1 | 10/2017 | Amanullah |
| 2018/0002589 | A1 | 1/2018 | Amanullah |
| 2018/0057729 | A1 | 3/2018 | Amanullah et al. |
| 2018/0163116 | A1 | 6/2018 | Amanullah |
| 2018/0171200 | A1 | 6/2018 | Amanullah |
| 2018/0171202 | A1 | 6/2018 | Amanullah |
| 2018/0340109 | A1 | 11/2018 | Amanullah |
| 2018/0346785 | A1 | 12/2018 | Amanullah et al. |
| 2019/0177596 | A1 | 6/2019 | Amanullah |
| 2019/0177597 | A1 | 6/2019 | Amanullah |
| 2019/0177598 | A1 * | 6/2019 | Amanullah ............... C09K 8/10 |
| 2019/0218869 | A1 | 7/2019 | Amanullah |
| 2019/0218870 | A1 | 7/2019 | Amanullah |

OTHER PUBLICATIONS

Kefi et al., "Optimizing in Four Steps Composite Lost-Circulation Pills Without Knowing Loss Zone Width", IADC/SPE, 2010, pp. 14, IADC/SPE.

* cited by examiner

ARC PERM-SQUEEZE RDF—A PERMEABLE PLUG FORMING RAPIDLY DEHYDRATING FLUID

CROSS-REFERENCE TO RELATED APPLICATIONS

This application is a divisional of and claims priority from U.S. Non-provisional application Ser. No. 15/815,159 filed Nov. 16, 2017, and titled "ARC PERM-SQUEEZE RDF—A PERMEABLE PLUG FORMING RAPIDLY DEHYDRATING FLUID," a copy of which is incorporated by reference in its entirety for purposes of United States patent practice.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when some or all of the drilling fluid (which may include drilling mud) pumped into a well does not return to the surface. While a de minimis amount of fluid loss is expected, excessive fluid loss is not desirable from a safety, economical, or environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

SUMMARY

Different types of traditional and specially designed loss control materials, slurries, and pills are used to control lost circulation. Loss control materials may generally be classified into several categories, such as surface plastering and shallow plugging materials, fracture sealing and deeper plugging materials (also referred to as "loss control slurries"), and interstitial bridging and pore plugging materials. Such lost circulation materials (LCMs) are used to mitigate the lost circulation by blocking the path of the drilling mud into the formation. The type of LCM used in a lost circulation situation depends on the extent of lost circulation and the type of formation.

Lost circulation may occur in the non-reservoir and reservoir sections of a wellbore. Controlling loss of circulation in reservoir sections using conventional LCMs may cause permanent sealing and plugging of the permeable channels and fractures, thus preventing production of oil and gas resources through these permeable channels and fractures and impacting the ultimate productivity of the well and the field. Consequently, certain LCMs may be more suitable for use in reservoir sections. For example, LCMs that are acid soluble are typically used in reservoir sections. However, the acid solubility of LCMs may only provide partial, or some instances, no restoration of the flow characteristics of original fractures and channels. First, the acids used to dissolve such LCMs may only react with the face of a plug, or only up to certain depth, and may not have any effect beyond about 25 millimeters (mm) to about 50 mm of the plug due to the escape of the acid to the wellbore zones with the lowest flow resistance. As a result, the barrier causing the flow restriction may remain in the permeable channels and fractures even after an acid treatment. Second, the acid treatment may produce a reaction byproduct that may precipitate and settle in the pores, pore throats, permeable channels and fractures with complete or partial blockage of these flow conduits. In some instances, the acid treatment may cause more damage than the LCM treatment itself.

In one embodiment, a lost circulation material (LCM) composition is provided. The LCM composition includes a carrier fluid, a particulate material includes a clay, a viscosifier, and, a fibrous material that includes date tree waste fibers. In some embodiments, the carrier fluid, the particulate material, the viscosifier, and the fibrous material form a homogenous mixture. In some embodiments, the carrier fluid includes water. In some embodiments, the viscosifier includes a cellulosic microfiber. In some embodiments, the date tree waste fibers include date tree rachis fibers, date tree leaf fibers, or a combination thereof. In some embodiments, the clay includes calcium montmorillonite clay. In some embodiments, the calcium montmorillonite clay is an amount in the range of 3 weight % of the total weight (w/w %) to 6 w/w % of the LCM composition. In some embodiments, the date tree waste fibers is an amount in the range of 6 weight % of the total weight (w/w %) to 9 w/w % of the LCM composition. In some embodiments, the LCM composition has a dehydration time of less than 12 minutes at 100 pounds-per-square inch differential (psid) pressure. In some embodiments, the LCM composition has a dehydration time of less than 1 minutes at 500 pounds-per-square inch differential (psid) pressure.

In another embodiment, a method to control lost circulation in a lost circulation zone in a wellbore is provided. The method includes introducing an altered drilling fluid into the wellbore such that the altered drilling fluid contacts the lost circulation zone and reduces a rate of lost circulation into the lost circulation zone, wherein the altered drilling fluid comprises a drilling fluid and a lost circulation material (LCM) composition. The LCM composition includes a carrier fluid, a particulate material includes a clay, a viscosifier, and, a fibrous material that includes date tree waste fibers. In some embodiments, the method includes adding the LCM composition to the drilling fluid to create the altered drilling fluid. In some embodiments, the carrier fluid, the particulate material, the viscosifier, and the fibrous material form a homogenous mixture. In some embodiments, the carrier fluid includes water. In some embodiments, the viscosifier includes a cellulosic microfiber. In some embodiments, the date tree waste fibers include date tree rachis fibers, date tree leaf fibers, or a combination thereof. In some embodiments, the clay includes calcium montmorillonite clay. In some embodiments, the calcium montmorillonite clay is an amount in the range of 3 weight % of the total weight (w/w %) to 6 w/w % of the LCM composition. In some embodiments, the date tree waste fibers is an amount in the range of 6 weight % of the total weight (w/w %) to 9 w/w % of the LCM composition.

In some embodiments, an altered drilling fluid is provided. The altered drilling fluid includes a drilling fluid and a lost circulation material (LCM) composition. The LCM composition includes a carrier fluid, a particulate material includes a clay, a viscosifier, and, a fibrous material that includes date tree waste fibers. In some embodiments, the carrier fluid includes water. In some embodiments, the viscosifier includes a cellulosic microfiber. In some embodiments, the date tree waste fibers include date tree rachis fibers, date tree leaf fibers, or a combination thereof. In some embodiments, the clay includes calcium montmorillonite clay. In some embodiments, the calcium montmorillonite clay is an amount in the range of 3 weight % of the total weight (w/w %) to 6 w/w % of the LCM composition. In some embodiments, the date tree waste fibers is an amount in the range of 6 weight % of the total weight (w/w %) to 9 w/w % of the LCM composition.

In some embodiments, a method of forming a lost circulation material (LCM) composition is provided. The method includes adding a carrier fluid to form a mixture, adding a particulate material to the mixture, the particulate material comprising a clay, adding viscosifier to the mixture, and adding a fibrous material to the mixture, the fibrous material comprising date tree waste fibers. In some embodiments, the LCM compositions forms a homogenous mixture. In some embodiments, the carrier fluid includes water. In some embodiments, the viscosifier includes a cellulosic microfiber. In some embodiments, the date tree waste fibers include date tree rachis fibers, date tree leaf fibers, or a combination thereof. In some embodiments, the clay includes calcium montmorillonite clay.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

The present disclosure includes compositions for use as a lost circulation material (LCM) to mitigate or prevent such lost circulation in a well and prevent or reduce the loss of drilling mud while drilling. The compositions described in this disclosure may create a plug in a fracture of a formation to reduce or prevent the loss of drilling mud into the surrounding formation and enable production of hydrocarbons without removal of the plug (for example, via an acid treatment). The plug formed by the LCM compositions described in the disclosure may have porosity-permeability ("poro-perm") characteristics similar to formation rock to provide for the infiltration of hydrocarbons through the plug matrix and enable production of hydrocarbons from the formation without removing the plug. Further, the compositions described in this disclosure are eco-friendly, non-toxic, and environmentally safe such that the use of such compositions for lost circulation control will have little to no detrimental effects on the subsurface environment and surrounding aquifers.

Additionally, the compositions described in this disclosure use raw materials that may be available locally and may encourage economic and job growth of local industries, such as the date farming industry. The compositions described in the disclosure also provide a viable recycling path for date tree waste (that is, portions of the date tree discarded after production of dates). Further, the production of compositions from locally available raw materials may reduce or eliminate the importation of conventional LCMs.

Figure 1:
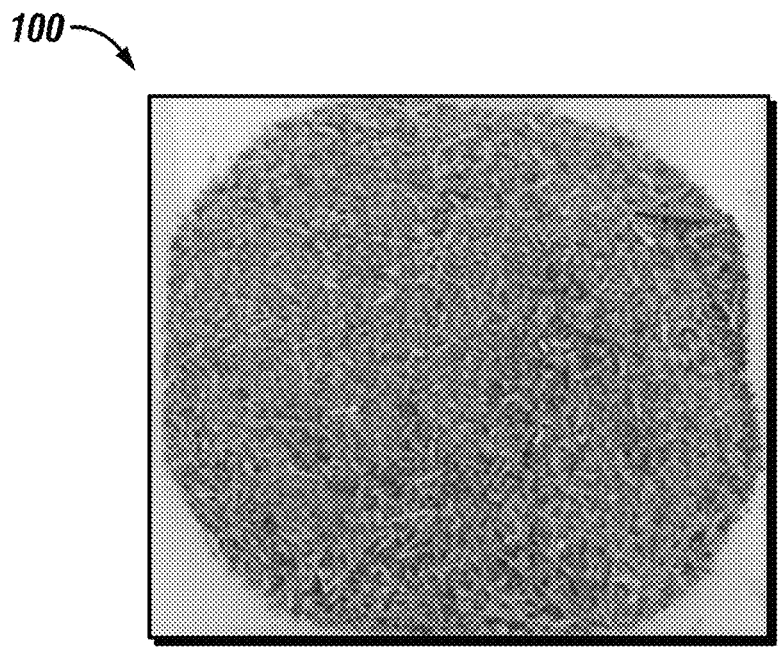
FIG. 1 is a photograph of fibers produced from the date tree waste in accordance with an embodiment of the disclosure.

The present disclosure includes rapidly dehydrating LCM compositions to control lost circulation in a lost circulation zone in a wellbore. In some embodiments, a rapidly dehydrating LCM composition includes a carrier fluid, a clay particulate material, a viscous material (also referred to as a "viscosifier"), and date tree waste fibers as a fibrous material. In some embodiments, the rapidly dehydrating LCM composition includes water as the carrier fluid, a calcium montmorillonite clay as the particulate material, a cellulosic microfiber viscosifier, and date tree rachis and leaf fibers produced from date trees (also referred to as "date palms") as the fibrous material. FIG. 1 is a photograph 100 of fibers produced from the date tree waste in accordance with an embodiment of the disclosure. As used in the disclosure, the term date tree waste refers to the waste produced from processing date trees (also referred to as "date palms") in the production of date fruits (also referred to as "dates"). The fibers may include, by way of example, fibers produced from date tree rachis (also referred to as "date tree rachis fibers") and fibers produced from date tree leaves (also referred to as "date tree leaf fibers"). In some embodiments, the LCM composition may form or be referred to as a rapidly dehydrating fluid (RDF). As will be appreciate, the plug may be used in reservoir zones and non-reservoir zones.

Rapidly Dehydrating LCM Compositions and Processes

In some embodiments, a rapidly dehydrating LCM (also referred to as a loss control slurry) may include a carrier fluid, a fibrous material, a clay particulate material, and a viscosifier. The carrier fluid may include freshwater, seawater, brines, brackish water, or formation fluid. The fibrous material may include a fibrous material derived from date tree waste, such as date tree rachis fibers and date tree leaf fibers. In some embodiments, the clay particulate material may include calcium montmorillonite clay. The viscosifier may include a suitable commercial viscosifier that can provide for rapid dehydration of the slurry at about 100 pounds-per-square inch differential (psid) to about 500 psid overbalance pressure. In some embodiments, the fibrous material may include date tree rachis fibers and date tree leaf fibers.

In some embodiments, a rapidly dehydrating LCM composition may include a carrier fluid, a clay particulate material, a viscosifier, and date tree rachis fibers. In some embodiments, a rapidly dehydrating LCM composition may include a carrier fluid, a clay particulate material, a viscosifier, and date tree leaf fibers. In some embodiments, a rapidly dehydrating LCM composition may include a carrier fluid, a clay particulate material, a viscosifier, date tree leaf fibers, and date tree leaf fibers.

In some embodiments the carrier fluid may include water. For example, the carrier fluid may include freshwater (water having relatively low (that is, less than 5000 parts-per-million by mass (ppm)) concentrations of total dissolved solids (TDS)), seawater (for example, water having a salinity in the range of about 30,000 to about 40,000 ppm TDS), artificial brines, natural brines, brackish water, or formation water.

In some embodiments, the particulate material of the LCM composition may include a clay. In some embodiments, the clay may be calcium montmorillonite clay. In some embodiments, the particulate material of the LCM composition may include calcium montmorillonite clay particles having a particle size of greater than about 25 microns. In some embodiments, the clay-based particulate material of the LCM composition may be Rev Dust® manufactured by Milwhite Inc., of Brownsville, Tex., USA. In some embodiments, the clay particulate material may include drill solids (that is, solid particles from a formation generated while drilling).

In some embodiments, the viscosifier may include a cellulosic microfiber derived from raw vegetable materials. In some embodiments, the viscosifier may be a non-toxic viscosifier having cellulose in the range of about 5 weight % of the total weight (w/w %) to about 25 w/w % and water, and a pH in the range of about 6 to about 7. In some embodiments, the viscosifier may include Betafib® manufactured by Cosun Biobased Products of Roosendaal, Netherlands.

In some embodiments, a rapidly dehydrating LCM composition may include water as a carrier fluid, calcium montmorillonite clay as a particulate material, a cellulosic microfiber as a viscosifier, and date tree rachis and leaf fibers as a fibrous material. In some embodiments, the calcium montmorillonite clay may be in the range of about 3 w/w % to about 6 w/w %. In some embodiments, the date tree rachis and leaf fibers may in the range of about 6 w/w % to about 9 w/w %. In some embodiments, the viscosifier may be in the range of about 2 w/w % to about 5 w/w %. In some embodiments, when subjected to a squeezing or overbalance pressure, the rapidly dehydrating LCM composition may eliminate all of a fluid phase in 12 minutes or less at about 100 psid overbalance pressure or less than about 1 minute at 500 psid overbalance pressure.

In some embodiments, when subjected to a squeezing or overbalance pressure, the rapidly dehydrating LCM composition can form a permeable plug in a fracture to prevent or reduce the loss of drilling mud into the surrounding formation and enable the production of hydrocarbons through the fracture during production. In some embodiments, a rapidly dehydrating LCM composition may have a greater concentration of fibrous material (for example, date tree rachis fibers) to form a plug having a relatively greater thickness, as compared to rapidly dehydrating LCM composition having lesser concentrations of the fibrous material. Advantageously, the plug formed by the rapidly dehydrating LCM composition does not need to be removed via an acid treatment (that is, by introducing acid into the wellbore) to move to the production phase of a well. That is, a plug formed by the rapidly dehydrating LCM composition may have poro-perm characteristics similar to that of formation rock in the reservoir, thus enabling the production of hydrocarbons through the plug matrix.

In some embodiments the fibrous material of the LCM composition may include date tree rachis fibers (that is, a material composed of such fibers) and date tree leaf fibers (that is, a material composed of such fibers). The date tree rachis and leaves may be obtained from date tree waste, such as produced as a waste by-product from date processing, date tree pruning, or both. In some embodiments, the date tree waste may be obtained from date processing plants to provide sustainable source of particulate material. Moreover, local sources of date tree waste may reduce the cost of imported LCM products, components, or both. In some embodiments, the date tree waste may be obtained from the species *phoenix dactylifera*. It should be appreciated that, in some embodiments, the date tree waste may be obtained from genetically modified date trees (that is, genetically modified organisms (GMOs)). In some embodiments, the date tree rachis and leaves may be prepared by cleaning the rachis and leaves, such as by blowing air over the rachis and leaves to remove dust, rubbish, and other material, and then chopping, crushing, and grinding the rachis and leaves using an industrial grinder to produce date tree rachis fibers and date tree leaf fibers. In some embodiments, the processed fibers may be sifted via a sieve to obtain a desired size of the fibrous material for use in the LCM composition described in the disclosure.

In some embodiments, the date tree rachis and leaf fibers may include untreated date tree rachis and leaf fibers, thus preserving the environmentally-friendly and biodegradable properties of the manufacturing process, the fibers, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date tree fibers may be manufactured without treating before, during, or after crushing, grinding, drying, or any other processing.

In some embodiments, a rapidly dehydrating LCM composition may be formed by adding a carrier fluid to a mixture, adding the clay-based particulate material (for example, calcium montmorillonite clay) to the mixture, adding a viscosifier to the mixture, and adding a fibrous material (for example, date tree rachis fibers, date tree leaf fibers, or both) to the mixture. In some embodiments, the rapidly dehydrating LCM composition may be formed by first adding the carrier fluid, followed by adding the clay-based particulate material (for example, calcium montmorillonite clay), followed by adding the viscosifier, and followed by adding a fibrous material (for example, date tree rachis fibers, date tree leaf fibers, or both). The LCM composition may be formed by mixing the carrier fluid, particulate material, viscosifier, and fibrous material in a high-speed mixer (for example, a commercial drilling fluid mixer) and forming a homogenous mixture, such as a homogenous fluid pill. In some embodiments, the LCM composition may be mixed for a time period (for example, in a range of about 1 minutes to about 5 minutes) after the addition of each component. In some embodiments the rapidly dehydrating LCM composition may be produced without any additives or treatments, thus preserving the environmentally-friendly and biodegradable properties of both the manufacturing process and the rapidly dehydrating LCM composition. In other embodiments, the rapidly dehydrating LCM composition may be mixed or otherwise combined with additives or otherwise treated. In some embodiments, additives may be mixed or otherwise combined with the LCM to change the rheology or pH of the LCM. In some embodiments, such additives may include softening agents, surface active agents (surfactants), viscosity agents, thinning agents, dispersants, coatings (for example, pellet coatings), pH modifiers, insecticides, biocides, or any suitable combination thereof.

Figure 2:
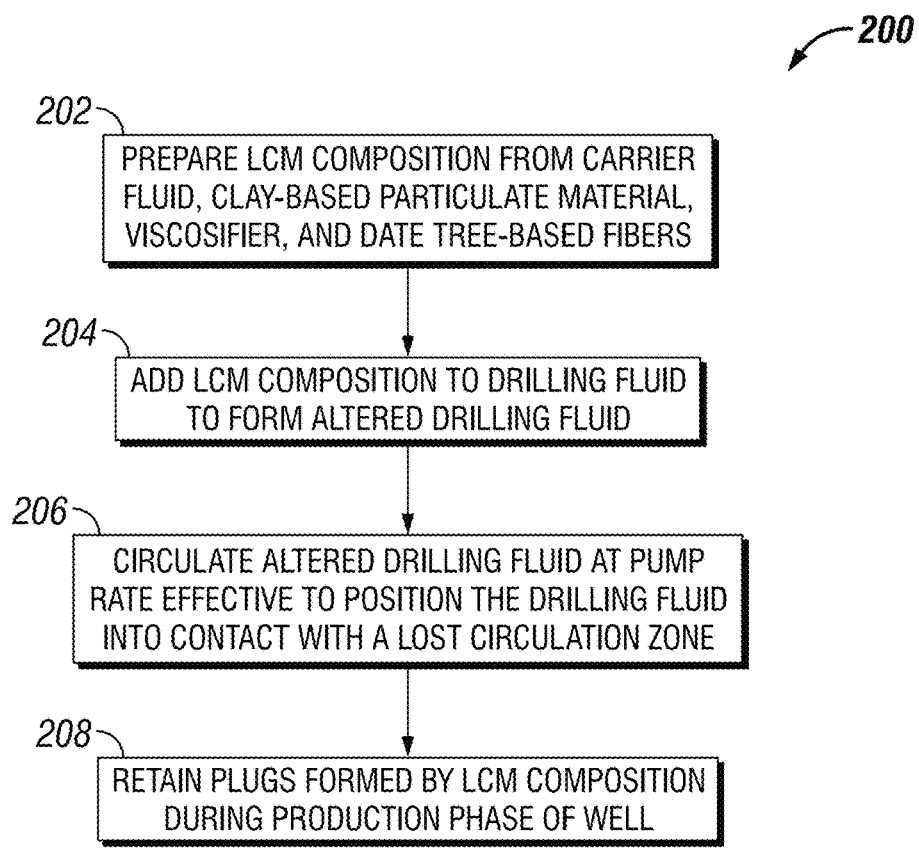
FIG. 2 is a block diagram of a process for preparing and using a rapidly dehydrating LCM composition in accordance with an embodiment of the disclosure.

FIG. 2 depicts a process 200 for preparing and using a rapidly dehydrating LCM composition in accordance with an embodiment of the disclosure. Initially, the rapidly dehydrating LCM composition may be formed from a carrier fluid, a clay particulate material, a viscosifier, and date tree waste fibers (for example, date tree rachis fibers, date tree leaf fibers, or both) (block 202). For example, in some embodiments, the rapidly dehydrating LCM composition may be formed by first adding the carrier fluid, followed by adding the clay particulate material (for example, calcium montmorillonite clay)), followed by adding the viscosifier, and followed by adding a fibrous material (for example, date tree rachis fibers, date tree leaf fibers, or both), and mixing in a high-speed mixer (for example, a commercial drilling fluid mixture) and forming a homogenous mixture. In some embodiments, the LCM composition may be mixed for a time period (for example, in a range of about 1 minutes to about 5 minutes) after the addition of each component and mixed for another time period after all components have been added to form an LCM pill (that is, a fluid pill formed of the LCM composition).

The LCM pill may be added to a drilling fluid, such as a drilling mud (block 204). For example, in some embodiments, the LCM pill may be added to (for example, blended with) an oil-based drilling mud or a water-based drilling mud. In some embodiments, an altered drilling fluid may be formed having the LCM pill. In some embodiments, the LCM pill may be added at the mud pit of a mud system. After addition of the LCM pill, the drilling fluid having the LCM pill (that is, an altered drilling fluid) may be circulated at a pump rate effective to position the LCM pill into contact with a lost circulation zone in a wellbore (block 206). Next, a pressure may be applied to form one or more plugs from the LCM pill, such that the rapidly dehydrating LCM composition of the pill alters the lost circulation zone by forming one or more plugs in the paths, cracks, and fractures in a formation in the lost circulation zone. For example, in some embodiments the plugs may form in less than about 12 minutes at a pressure of about 100 psid. In some embodiments, the plugs may form in less than about 1 minute at a pressure of about 500 psid. It should be appreciated that the time period for formation of the plugs may be also be based on the type of formation (for example, the size of the paths, cracks, and fractures in the formation).

The plugs formed by the LCM composition may be retained during the production phase of the well (block 208). Advantageously, the retention of the plugs avoids the use and introduction of acid (for example, hydrochloric acid) in the wellbore (referred to as "an acid treatment job"). Hydrocarbons may be produced from the lost circulation zone having the permeable plugs such that the plugs prevent the loss of whole mud during the drilling phase do not need to be removed during the production phase. As noted in the disclosure, the eco-friendly, non-toxic, and environmentally friendly properties of the rapidly dehydrating LCM composition may minimize or prevent any environmental impact, any effect on ecosystems, habitats, population, crops, and plants surrounding the drilling site where the rapidly dehydrating LCM composition is used. Moreover, the elimination of the use of acid to remove the plugs and being production from the well further minimizes or prevents further environment impact on ecosystems, habitats, population, crops, and plants surrounding the drilling site

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of LCM compositions were prepared and evaluated to determine the rapidity of dehydration, the plug forming capabilities, and the permeability of the formed plug. Table 1 shows the formulations of the example LCM compositions used in the tests, with compositions of the components provided in milliliters (ml) or grams (g), and also expressed as weight of the total weight (w/w %) of the LCM composition:

TABLE 1

| Example LCM formulation for testing | | |
|---|---|---|
| Component | Description | Amount |
| Water (ml) | Carrier Fluid | 350 |
| Particulate Material (g) | Rev Dust ® | 20 (4.8 w/w %) |
| Viscosifier (g) | Betafib ® | 15 (3.6 w/w %) |
| Fibrous Material (g) | Date Tree Rachis and Leaf Fibers | 30 (7.2 w/w %) |

As shown in Table 1, the example LCM formulation included a calcium montmorillonite clay, Rev Dust® manufactured by Milwhite Inc., of Brownsville, Tex., USA. Rev Dust® is a non-reactive clay particulate material having a particle size greater than about 25 microns. The example formulation also includes a cellulosic microfiber viscosifier, Betafib®, manufactured by Cosun Biobased Products of Roosendaal, Netherlands. Each formulation also included a fibrous material of rachis fibers and leaf fibers obtained from the date tree *phoenix dactylifera*.

A fluid pill of the example LCM formulation was prepared by mixing each component into a mixture using a high speed mixer, in the order shown in Table 1: Rev Dust® was added to the carrier fluid in the mixture, followed by addition of the Betafib®, followed by addition of the date tree rachis and leaf fibers. The rapidity of dehydration of a fluid pill of the example LCM formulation was evaluated according to the tests described infra.

The formulation was tested using an American Petroleum Society (API) filter press to simulate relatively large fractures bounded by a formation having a relatively low permeability. The API filter press includes a filtration cell to contain the LCM composition undergoing testing. The formulation was testing using the following dehydration test procedure:

1. Install an API filter paper having a pore size of less than about 5 microns into the API filter press;
2. Prepare formulation by mixing each component in a commercial drilling fluid mixer to form a homogenous mixture;
3. Fill filtration cell of API filter press with a 350 cubic centimeter (cc) pill of the formulation;
4. Mount filtration cell to API filter press, affix the top lid, and connect an air pressure line of nitrogen gas at about 100 psid pressure; and
5. Measure the dehydration time of the pill (that is, the time for the fluid (about 350 cc) to be removed) at room temperature and 100 psid pressure and collect discarded fluid (that is, expelled carrier fluid) in a fluid collection pot at the bottom outlet of the API test cell.

The results of the dehydration tests are shown in Table 2, with the dehydration time measured in minutes (min) and the thickness of the plug formed by the dehydrated pill measured in mm:

TABLE 2

Results of Dehydration Test Simulating Relatively Large Fractures Bounded by a Formation Having a Relatively Low Permeability
Dehydration Test (100 psi Pressure, Room Temperature)- API Test Apparatus

| Parameters | Test-1 | Test-2 | Test-3 |
| --- | --- | --- | --- |
| Dehydration Time (min) | 9.5 | 11 | 10 |
| Deposited Plug Thickness (mm) | 40 | 38 | 39 |

It was observed that immediately after application of the 100 psid pressure, 2-3 cc of spurt loss expelled from the API test cell. However, solids-free colored water exited the test cell after the initial spurt loss. The colored water was due to the de-coloration of the date tree-based fibers used in the example LCM formulation.

Figure 3:
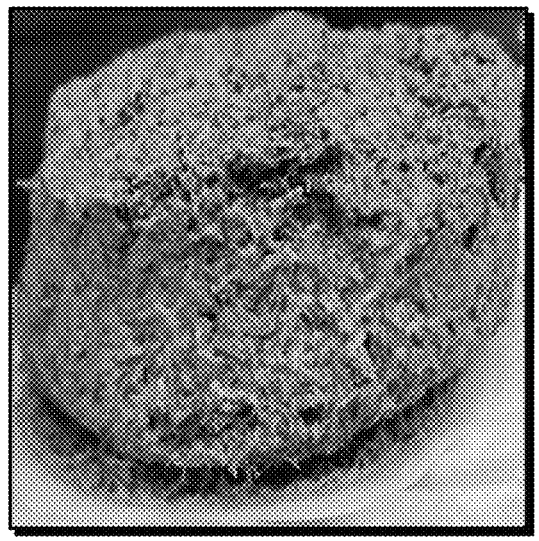
FIG. 3 is a photograph of a plug formed in a test cell after a dehydration test of an example rapidly dehydrating LCM composition in accordance with an embodiment of the disclosure.

FIG. 3 is a photograph 300 of the plug formed in the test cell after the dehydration test according to the procedure described supra. As shown in Table 2, for a 350 cc pill in the API filtration cell under 100 psi differential (psid) pressure, each formulation exhibited dehydration time of less than 3 minutes (that is, a solid plug was formed in 3 minutes or less dehydration time under 100 psid pressure). As shown in FIG. 3, the shape of the plug deformed during the removal from the test cell. The prevention of the loss of whole mud after the initial spurt loss indicated that the plug formed by the example LCM formulation has the ability to prevent the loss of whole mud while drilling. Further, the infiltration of the fluid phase through the plug matrix indicated that the plug may enable the production of hydrocarbons via conductive fractures and permeable channels after completion of a well. Thus, the example LCM formulation has the ability to create a plug having poro-perm characteristics similar to rock to stop whole mud loss while drilling but enabling hydrocarbon production from conductive fractures and super-K zones after completion of a well.

A diesel flow test was also conducted at 100 psid to predict the hydrocarbon production capability of the plug. After the dehydration test procedure described supra, a diesel flow test was performed according to the following procedure:

1. Release the pressure and remove the top lid of the API test cell.
2. Pour about 150 cc of diesel on top of the plug, affix the top lid, and connect the air pressure line of nitrogen gas at about 100 psid pressure; and
3. Collect the diesel pushed through the plug matrix in a fluid collection pot at the bottom outlet of the API test cell.

The results of the diesel flow test are shown in Table 2, with the dehydration time measured in minutes (min) and the thickness of the plug formed by the dehydrated pill measured in mm:

TABLE 3

Results of Diesel Flow Time Test
Diesel Flow Test (150 cc diesel, 100 psi Pressure, Room Temperature)-API Test Apparatus

| Parameters | Test-1 | Test-2 | Test-3 |
| --- | --- | --- | --- |
| Effluent Time (min) | 8.3 | 8.5 | 9.3 |
| Deposited Plug Thickness (mm) | 40 | 38 | 39 |

As shown in Table 3, in each test the diesel exited the plug matrix in less than 10 minutes (other than the minimal amounts of diesel absorbed by the plug). The behavior of the diesel and plug matrix is similar to the residual hydrocarbon in place of a reservoir. Thus, the example LCM formulation has the ability to form dual functional permeable plugs having a first function of preventing the loss of whole mud while drilling and a second function of enabling hydrocarbon production from conductive fractures and permeable channels having the formed plugs.

The formulation was also tested using the API filter press to simulate relatively large fractures bounded by a formation having a relatively high permeability. The formulation was testing using the following dehydration test procedure to simulate relatively large fractures bounded by a formation having a relatively high permeability:

1. Install a metal screen having a mesh size of 20 into the API filter press to simulate a 250 micron pore size;
2. Prepare formulation by mixing each component in a commercial drilling fluid mixer to form a homogenous mixture;
3. Fill filtration cell of API filter press with a 350 cubic centimeter (cc) pill of the formulation;
4. Mount filtration cell to API filter press, affix the top lid, and connect an air pressure line of nitrogen gas at about 100 psid pressure; and
5. Measure the dehydration time of the pill (that is, the time for the fluid (about 350 cc) to be removed) at room temperature and 100 psid pressure and collect discarded in a fluid collection pot at the bottom outlet of the API test cell.

The results of the dehydration tests are shown in Table 4, with the dehydration time measured in minutes and the thickness of the plug formed by the dehydrated pill measured in mm:

TABLE 4

Results of Dehydration Test Simulating Relatively Large
Fractures Bounded by a Formation Having a Relatively
High Permeability
Dehydration Test (100 psi Pressure, Room Temperature)-
API Test Apparatus

| Parameters | Test-1 | Test-2 | Test-3 |
|---|---|---|---|
| Dehydration Time (min) | <1 | <1 | <1 |
| Deposited Plug Thickness (mm) | 37 | 38 | 37 |

It was observed that immediately after application of the 100 psid pressure, all of the carrier fluid expelled from the test cell as a cloudy fluid, similar to a mud spurt. The cloudiness of the fluid slowly reduced with the growth of the plug in the test cell. Due to the poor consolidation of the plug at the test pressure and the 60 mesh size screen, the whole mud loss continued with a reduced rate of loss during the test. The reduced rate of whole mud loss indicates the whole mud loss mitigation ability of the example LCM formulation.

Figure 4:
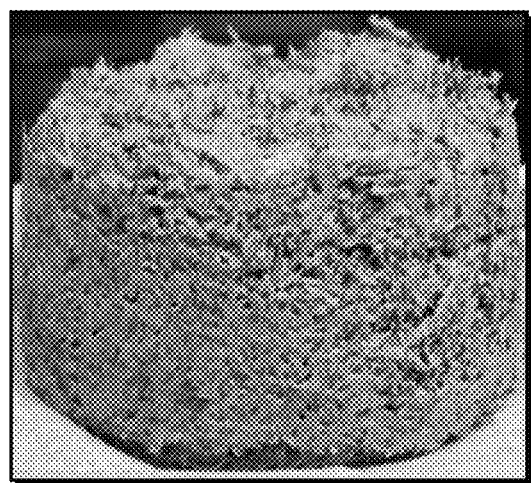
FIG. 4 is a photograph of a plug formed in a test cell after a dehydration test of an example rapidly dehydrating LCM composition simulating relatively large fractures bounded by a formation having a relatively high permeability.

FIG. 4 is a photograph 400 of the plug formed in the test cell after the dehydration test simulating relatively large fractures bounded by a formation having a relatively high permeability described supra. The infiltration of the mud through the plug matrix indicates the permeability of the plug. This permeability further indicates the ability to create a plug having poro-perm characteristics similar to rock to enable hydrocarbon production from conductive fractures and super-K zones after completion of a well.

A diesel flow test was also conducted at 100 psid to predict the hydrocarbon production capability of the plug, according to the procedure described supra.

The results of the diesel flow test are shown in Table 5, with the dehydration time measured in minutes (min) and the thickness of the plug formed by the dehydrated pill measured in mm:

TABLE 5

Results of Diesel Flow Time Test
Diesel Flow Test (150 cc diesel, 100 psi Pressure,
Room Temperature)-API Test Apparatus

| Parameters | Test-1 | Test-2 | Test-3 |
|---|---|---|---|
| Effluent Time (min) | <1 | <1 | <1 |
| Deposited Plug Thickness (mm) | 37 | 38 | 37 |

As shown in Table 5, in each test the diesel exited the plug matrix in less than 1 minute (other than the minimal amounts of diesel absorbed by the plug). Here again, the behavior of the diesel and plug matrix is similar to the residual hydrocarbon in place of a reservoir, further demonstrating that example LCM formulation has the ability to form dual functional permeable plugs that prevent the loss of whole mud but enable hydrocarbon production from conductive fractures and permeable channels.

Another dehydration test was performed on the example LCM formulation using a 2 millimeter (mm) slotted metal disc and a Permeability Plugging Tester (also referred to as a "PPT" or "Pore Plugging Test" apparatus) manufactured by OFI Testing Equipment, Inc., of Houston, Tex., USA, to simulate a relatively large fracture bounded by a group of relatively small fractures (for example, fractures of about 2 mm). The conventional cell of the Permeability Plugging Tester used in the plugging efficiency test may be operated up to 2,000 pounds-per-square inch differential (psid) and 500° F. (260° C.). The 2 mm slotted metal disc was used as the filter medium of the Permeability Plugging Tester in the plugging efficiency test. The dehydration test was performed at a temperature of about 100° C. to simulate an equivalent bottom hole temperature of a reservoir, and at a pressure of about 500 psid.

The example LCM formulation was tested using the Permeability Plugging Tester apparatus and the following plugging efficiency test procedure:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Placing about 350 cc of the prepared example LCM formulation into the test cell;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;
14. Place the cell into the heating jacket of the Permeability Plugging Tester apparatus;
15. Connect a pressure hose from the hydraulic hand pump to the bottom of the test cell via a quick connector and ensure the bottom stem is closed;
16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.
17. Place a thermometer into the hole at the top of the test cell. wait until the testing temperature is reached, and monitor the cell pressure while heating and bleed off pressure if necessary by opening the pressure relived valve on the side of the hydraulic hand pump;
18. Once the test sample has reached the testing temperature, pump the hydraulic hand pump until the pump gauge shows the testing pressure plus the required back pressure;
19. Apply the required back pressure to the top of the cell, open the top valve, and pump the hydraulic hand pump to reestablish the testing pressure;

20. Measure the dehydration time of the pill (that is, the time for the fluid (about 350 cc) to be expelled) collect fluid from the back pressure collector in a container.

Table 6 shows the results of the dehydration test using the PPT apparatus, with expelled volume measured in cubic centimeter (cc), the time in minutes, and the plug thickness in mm. It should be noted that the time required to expel the fluid includes the interruption time required to maintain the pressure using the hand pump:

TABLE 6

Results of Dehydration Test Simulating Relatively Large Fractures Bounded by a Group of Relatively Small Fractures Dehydration Test (500 psid Pressure, 100° C. Temperature)-PPT Test Apparatus

| Expelled fluid volume (cc) | Time Required to Expel (min) | Plug Thickness (mm) |
|---|---|---|
| 200 | 27 | 54 |

An initial spurt loss of about 2 cc to about 3 cc was observed immediately after application of the 500 psid pressure via the hand pump. After the initial sport loss, solids-free colored water was expelled due to the de-coloration of the date tree-based fibers used in the example LCM formulation.

Figure 5:
FIG. 5 is a photograph of a plug formed in a Permeability Plugging Tester ("PPT") cell after a dehydration test of an example rapidly dehydrating LCM composition in accordance with an embodiment of the disclosure.

FIG. 5 is a photograph 500 of the plug formed in the PPT cell after the dehydration test according to the procedure described supra. After dismantling the PT cell, the plug formed was found to be equal to the inner diameter of the PPT cell, thus simulating a big fracture formed and in fluid connection with the small fractures represented by the 2 mm slots. As shown in Table 6, the plug formed by complete dehydration of the example LCM formulation occurred in about 27 minutes. However, if the time spent maintaining the pressure using the hand pump is excluded, the dehydration time is less than about 27 minutes. FIG. 5 illustrates the ability of the example LCM formulation to form a plug in fractured zones bounded by relatively small fractures. The application of the 500 psid pressure allowed the formation of a mechanically stable plug with adequate compressive and shear strength. As will be appreciated, as plug thickness is a factor in the creation of stable seal in fractures, a greater concentration of the example LCM formulation may be used in loss zones having relatively large fractures.

After the initial spurt loss, the colored fluid (due to the de-coloration of the date tree fibers) indicates the ability of the plug formed by the example LCM formulation to prevent loss of while mud while drilling. Moreover, the infiltration of the colored water through the plug indicates the ability of the example LCM formulation to provide for the production of hydrocarbons through the plug matrix during the production phase of a well.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method of forming a lost circulation material (LCM) composition, comprising:
    adding a carrier fluid to form a mixture;
    adding a particulate material to the mixture, the particulate material comprising a clay;
    adding a viscosifier to the mixture, wherein the viscosifier comprises a cellulosic microfiber; and
    adding a fibrous material to the mixture, the fibrous material comprising date tree waste fibers, wherein the date tree waste fibers comprise an amount in the range of 6 weight % of the total weight (w/w %) to 9 w/w % of the LCM composition.

2. The method of claim 1, wherein the LCM composition comprises a homogenous mixture.

3. The method of claim 1, wherein the carrier fluid comprises water.

4. The method of claim 1, wherein the date tree waste fibers comprise date tree rachis fibers, date tree leaf fibers, or a combination thereof.

5. The method of claim 1, wherein the clay comprises calcium montmorillonite clay.

\* \* \* \* \*